(12) United States Patent
Keaveny et al.

(10) Patent No.: US 9,783,109 B2
(45) Date of Patent: *Oct. 10, 2017

(54) SYSTEM AND METHOD FOR PROVIDING FEEDBACK TO A VEHICLE DRIVER

(71) Applicant: Trapeze Software ULC, Mississauga (CA)

(72) Inventors: Ian Keaveny, Burlington (CA); Sebastien James Hinds, Trowbridge (GB); Andrew Henry Leitch Kerr, Stenhousemuir (GB)

(73) Assignee: Trapeze Software ULC, Mississauga (CA)

( * ) Notice: Subject to any disclaimer, the term of this patent is extended or adjusted under 35 U.S.C. 154(b) by 34 days.

This patent is subject to a terminal disclaimer.

(21) Appl. No.: 14/134,848

(22) Filed: Dec. 19, 2013

(65) Prior Publication Data

US 2015/0175067 A1    Jun. 25, 2015

(51) Int. Cl.
  *B60Q 1/00* (2006.01)
  *B60Q 9/00* (2006.01)
(52) U.S. Cl.
  CPC .................................... *B60Q 9/00* (2013.01)

(58) Field of Classification Search
  CPC .. B60W 2520/105; B60W 40/09; G01B 11/00
  See application file for complete search history.

(56) References Cited

U.S. PATENT DOCUMENTS

| 8,258,934 | B2 | 9/2012 | Filev et al. | |
|---|---|---|---|---|
| 2002/0121981 | A1* | 9/2002 | Munch | G08B 21/06 340/576 |
| 2010/0312466 | A1* | 12/2010 | Katzer | G01C 21/3492 701/533 |
| 2011/0196571 | A1* | 8/2011 | Foladare et al. | 701/33 |
| 2011/0307188 | A1* | 12/2011 | Peng et al. | 702/33 |
| 2013/0049987 | A1* | 2/2013 | Velusamy | 340/905 |
| 2014/0132407 | A1* | 5/2014 | Kumai | G08G 1/0962 340/439 |
| 2015/0134226 | A1* | 5/2015 | Palmer | B60W 40/10 701/101 |

* cited by examiner

*Primary Examiner* — Omeed Alizada
(74) *Attorney, Agent, or Firm* — Elan IP Inc.

(57) ABSTRACT

A method and system for providing feedback to a vehicle driver are provided. Metrics are collected for a vehicle being operated. The metrics are categorized into one of a set of discrete performance categories. Sensory feedback is presented to a driver of the vehicle corresponding to the one discrete performance category.

9 Claims, 5 Drawing Sheets

SYSTEM AND METHOD FOR PROVIDING FEEDBACK TO A VEHICLE DRIVER

FIELD OF THE INVENTION

The present invention relates to the field of vehicle system monitoring. In particular, it relates to a system and method for providing feedback to a vehicle driver.

BACKGROUND OF THE INVENTION

The process of providing feedback to drivers of vehicles can take a significantly long period of time in many cases. Typical methods of receiving input about a driver's performance include examining the fuel that the driver consumes, tracking travel times for the driver and input from passengers that is only provided very infrequently. It can take a long time for such inputs to be analyzed and correlated to spot potential areas for improvement.

Another method to gather input about a driver's performance is to place an observer on the vehicle. If the driver does not have knowledge of the observer, the information collected by the observer is typically recorded and analyzed first.

With all of these inputs, any feedback generated as a result generally is provided well after the actual performance being analyzed. As a result, the driver may not recall the particular performance. Further, any negative performance feedback provided makes the driver feel threatened.

In some cases, the driver's performance is analyzed openly, with an overt observer riding the vehicle to observe the driver's performance. In such cases, while the feedback may be provided in a relatively timely manner to the driver, the driver may alter his driving behavior in response to the presence of the overt observer on the vehicle.

It is therefore an object of this invention to provide a system and method for providing feedback to a vehicle driver.

SUMMARY OF THE INVENTION

In accordance with an aspect of the invention, there is provided a method for providing real-time feedback to a vehicle driver, comprising obtaining a set of metrics for a vehicle, categorizing said metrics into one of a set of discrete performance categories and presenting sensory feedback to a vehicle driver corresponding to said one discrete performance category, as the vehicle is being operated by the vehicle driver.

Each metric may have two discrete performance categories, acceptable and unacceptable, and categorizing may comprise determining, for each of the set of metrics, whether they are acceptable or unacceptable.

Presenting sensory feedback may comprise providing feedback if, and as soon as, any of the metrics are categorized as unacceptable.

The sensory feedback may be a light cluster mounted in view of the driver, comprising a red light that is illuminated when any of the metrics are categorized as unacceptable.

The set of metrics may comprise longitudinal acceleration, lateral acceleration and jerkiness.

The collecting may further comprise obtaining a set of historical metrics. The set of discrete performance categories may be defined using the historical metrics.

The sensory feedback may be a light cluster mounted in view of the driver, comprising a red light, an amber light and a green light, one of which is illuminated based on the result of the categorizing.

The historical metrics may comprise historical vehicle metrics and historical driver metrics.

The discrete performance categories may be: better than historical vehicle average, close to historical vehicle average and worse than historical vehicle average. Better than historical vehicle average may correspond to the green light, close to historical vehicle average may correspond to the amber light and worse than historical vehicle average may correspond to the red light.

The discrete performance categories may be: better than historical driver average, close to historical driver average and worse than historical driver average. Better than historical driver average may correspond to the green light, close to historical driver average may correspond to the amber light and worse than historical driver average may correspond to the red light.

The collecting and presenting may occur as the vehicle is being operated on a known route and the historical metrics may have been obtained on the known route.

The collecting may further comprise obtaining a set of historical incidents for a route the driver is driving and a set of historical incidents for the driver where each incident comprises an incident location where the incident occurred.

The presenting sensory feedback may comprise determining if an incident occurred at a location on the route the driver is driving, before the driver has arrived at the location and presenting sensory feedback to a vehicle driver corresponding to said one discrete performance category, as the vehicle is approaching the location.

The presenting sensory feedback may comprise determining if any incident in the set of historical incidents for the driver may occur at a future location on the route and and presenting sensory feedback to a vehicle driver corresponding to said one discrete performance category, as the vehicle is approaching the future location.

Other and further advantages and features of the invention will be apparent to those skilled in the art from the following detailed description thereof, taken in conjunction with the accompanying drawings.

BRIEF DESCRIPTION OF THE DRAWINGS

The invention will now be described in more detail, by way of example only, with reference to the accompanying drawings, in which like numbers refer to like elements, wherein.

DETAILED DESCRIPTION OF THE EMBODIMENTS

Figure 1:
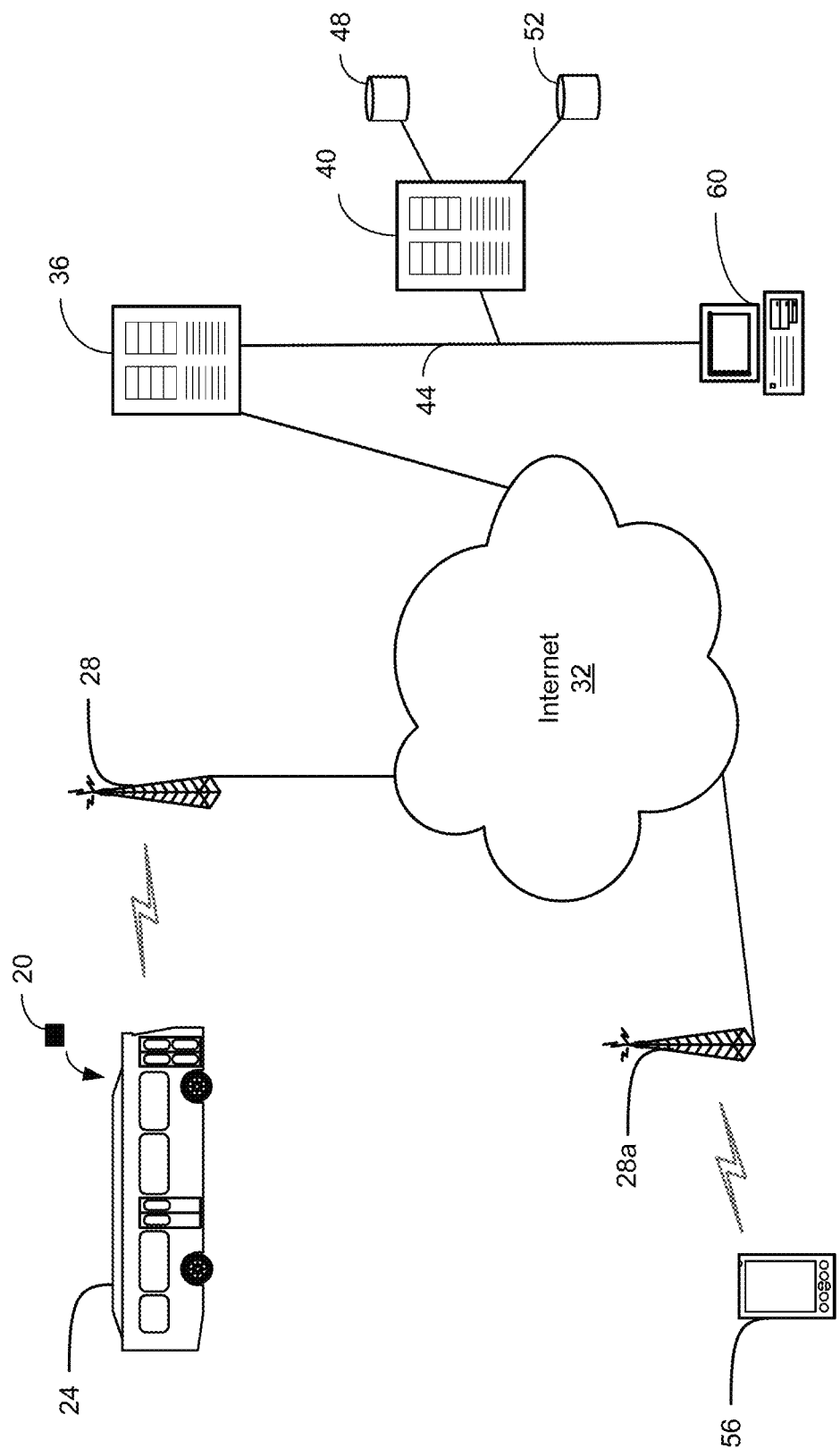
FIG. 1 is a schematic diagram of a system for analyzing performance data in a transit organization in accordance with an embodiment of the invention, and its operating environment.

A vehicle for use with the invention is equipped, either permanently or temporarily (even removably) with a metric collecting and processing system that collects one or more types of metrics for the vehicle while it is being operated. The system then processes the metrics and classifies them in one of a set of discrete performance categories. Sensory feedback corresponding to the one discrete performance category is then presented to the driver of the vehicle.

By presenting the feedback relatively soon after the driving performance, the driver can better associate the feedback provided with the actual performance. Further, it can alert the driver relatively quickly of his performance, thereby enabling the driver to correct or otherwise modify his driving behavior, if so required. By providing such feedback somewhat constantly and arbitrarily, the driver can be made aware of trends in his driving behavior. Still further, as the feedback is presented to the driver by an apparatus, the driver may feel less threatened by the feedback were it being delivered by a supervisor.

As the sensory feedback provided to the driver represents discrete performance categories, the sensory output can be distinct and, thus, readily understood by the driver without requiring much thought.

In the embodiment described below, a transit organization collects acceleration metrics for transit vehicles and processes the acceleration metrics to generate a weighted score per unit measurement. The weighted score per unit measurement is then categorized into one of three discrete performance categories. A light in a light cluster having a color corresponding to the selected discrete performance category is then lit up for the course of the next unit measurement, after which another weighted score per unit measurement is calculated.

Performance, as the term is used herein, and is measured by metrics.

There are a variety of metrics that can be of interest to transit organizations in defining performance. One set of metrics measured is the acceleration (via acceleration data) or g-force, experienced by a vehicle. These g-force metrics can provide a sense of how "hard" a driver is accelerating, braking or cornering.

Another set of metrics relates to the "jerkiness" of a ride. "Jerkiness" refers to the rate of change of acceleration, with higher rates of change in acceleration being characterized as being more "jerky" or resulting in more "jerk" being experienced (for example by a rider). Examples of "jerky" driving include sudden hard acceleration from a standing start, and sudden hard braking It is becoming increasingly important that transit organizations collect performance data and then analyze this data to more clearly understand what affects the efficiency and cost of their operation. If transit organizations could recognize trends in the performance data and attribute the trends to specific factors then they could identify underperforming drivers and vehicles and take appropriate action. In particular, relatively-high g-force and "jerkiness" metrics are associated with greater vehicle component wear, a poor passenger experience and poor fuel economy. It is therefore very important to use the g-force metrics in the vehicle analysis and in the evaluation of drivers since the cost of fuel and maintenance in a transit operation is significant. A number of the principles that characterize good driving skills and habits are listed below.

Slow, Smooth Acceleration from a Stop:

Slow, smooth acceleration from a stop position consumes considerably less fuel than quick, heavy-footed acceleration. This may be referred to as longitudinal positive acceleration and may be part of a set of metrics and acceleration metrics.

Slow, Smooth Braking:

Slow, smooth breaking when approaching an expected stop causes significantly less wear on the break components of a vehicle in comparison to abrupt application of the brakes. Additionally, slow, smooth breaking provides a less jerky riding experience for commuters. This may be referred to as longitudinal negative acceleration (though it may be stored as a positive value) and may be part of a set of metrics and acceleration metrics.

Modest Idling:

When a vehicle is expected to remain stationary for a number of minutes, the savings on fuel consumption achieved by turning off the engine exceeds the cost of additional wear on the engine by restarting it. In the course of a day a transit vehicle will spend considerable time idling—picking up and dropping off passengers, waiting at traffic lights, road congestion, etc. As a consequence in any fuel analysis the idling usage (over which the driver has no control) should be removed. There are also situations where excessive idling is not expected (for example, at a depot) and these need to be identified as 'incidents' and again should not be included in the driver and vehicle analysis. Idling may generally be defined to occur when velocity is zero and fuel consumption is greater than zero.

Moderate Speed:

The wear and tear on a vehicle as well as the fuel consumption is significantly reduced when driven at moderate speeds in comparison to higher speeds. By maintaining the RPM of the engine in a lower, more-efficient range, fuel can be saved. Further, moderate speeds are associated with lower incident rates and with reduced severity of incidents, and are thus associated with lower liabilities.

Minimal Anticipation:

Anticipation refers to the practice of releasing the brake pedal in anticipation of a 'green' light or of gently applying the brakes in anticipation of a 'red' light. As is often the case, a green light, for example, may occur more slowly than expected, resulting in a need to reapply the brake. The result is unnecessary jerking of commuters and additional wear on the brake components.

Fast Cornering:

Cornering while traveling at higher speeds exerts greater lateral g-forces on the vehicle and its passengers than cornering while traveling at lower speeds. In addition, cornering at higher speeds causes significantly higher wear on the tires of a vehicle. This may be referred to as lateral acceleration (with right turns being positive lateral acceleration and left turns being negative lateral acceleration though it may be stored as a positive value, for example).

Similarly, the condition of a vehicle can vary significantly, thus impacting the various metrics of the vehicle. There are many ways in which the condition of a vehicle can be poor. For example, the transmission may be faulty, leading to poor or irregular engagement of the drive train and ultimately to jerkiness in the ride. The brake system may not be operating well, causing braking to be jerky. A filter can be underperforming, either due to being dirty or otherwise malfunctioning. One or more spark plugs may not be firing correctly. The fuel injection system or carburetor may be performing irregularly. Any of these can result in poor ride quality.

Other factors can affect ride smoothness for individual runs. These other factors include, but are not limited to, the vehicle type, the route travelled, and the general time of day during a vehicle is operated. Other factors affecting a vehicle's metrics exist, such as irregular events that trigger fluctuations in the volume of fares or the traffic present, driving conditions precipitated by bad weather or passenger medical emergencies.

When analyzing performance data over a substantial period of time (for example three months), however, these factors become less significant than the general driving habits and skills of the driver, and the condition of the vehicle.

By analyzing accelerometer metrics/data and other resulting metrics for drivers and/or vehicles, bad driving skills and habits, or bad vehicle condition, can be identified. In order to generate comparable performance data, the various accelerometer metrics can be collected over collection periods, summarized by one or more of i) selecting those accelerometer metrics having the largest magnitudes over the collection periods as representative of those collection periods, and scoring those representative accelerometer metrics, ii) measuring each accelerometer metric during the collection period, summing them, and dividing by the number of samples taken, and iii) taking the largest magnitude during the collection period. In one embodiment, ii) may be used in conjunction with iii) where the summed amount is used to determine a score and the data from iii) is used to track incidents. For example, if a collection period is short (ie a second) the values/scores produced via i) and ii) may be similar. Longer collection periods may result in greater differences. Such differences may overly penalize a driver for having to brake hard at a particular time (when it may be very normal for drivers to have to brake hard at least occasionally); but incidents may still be desirable to track (for example for driver evaluation and to provide warnings of incidents before they might occur, as described herein). Incidents may be stored as incident data; incident data may include: an incident ID, a route being traveled (if applicable), an incident type, values associated with the incident (vehicle speed and acceleration data during the incident, date/time, weather, etc). The scores are then further summarized by totaling them over a unit measurement/distance, and comparing them to a worst possible score or other benchmark to determine a relative score per unit measurement. It can be desirable to score accelerometer metrics corresponding to different driving scenarios. To better understand the driver's skill unit distance analysis can also be broken down into a number of complementary or elementary data, such as forward acceleration, braking and cornering (both left and right—as drivers/vehicles may experience greater difficulty with one direction of turns then the other) and jerkiness. The scoring and tallying of the accelerometer metrics separately for each driving scenario enables the calculation of an overall performance metric (such as SUD) that is a weighted average of the relative scores per unit measurement for each driving scenario. In this manner, different importance can be given to different driving scenarios. Further, by tracking a jerk metric in the same manner, this characteristic of the driver and/or vehicle can be analyzed. One approach to the data collection and how this data is used to calculate driver and vehicle 'scores' used in the analytical process is:

i) The OBU collects information from the accelerometer as well as from the engine (or from other sources of acceleration metrics/data as discussed herein). The various accelerometer and engine metrics are continuously monitored over a user specified time period and the maximum g-force values observed during this time period as well as the cumulative g-force values are stored (for example in both a positive and negative direction for both a longitudinal and lateral axis). At regular intervals during the day and/or when the vehicle returns back to the depot at the end of the work shift the information stored on the OBU is transmitted (GPRS and WiFi, or other communication types) to a database server—as described herein.

ii) The work performed by a driver during their workday is broken into Unit Distances (for example 500 meters). Calculations are made (as described herein), using the granular data collected on the OBU a Score per Unit Distance (SUD) as well as the Moving Fuel used per Unit Distance (FUD) (where fuel used when not moving—such as idling—is removed, and also where). In this way it is apparent that that the smoothness of the ride (SUD) is directly proportional to the fuel consumed when the vehicle is moving.

System and Operating Environment

FIG. 1 shows a system for analyzing performance data in a transit organization in accordance with an embodiment of the invention, and its operating environment.

An on board unit ("OBU") 20, commonly referred to as a "black box", is installed in a transit vehicle 24. The OBU 20 is a device that collects performance data about the vehicle while the vehicle is in operation, temporarily stores the performance data, and then transmits the performance data at regularly scheduled intervals using WiFi, GPRS or some other manner of communication. The OBU 20 is secured inside the vehicle 24 so that it is not easily removable without the use of a screwdriver. The OBU 20 is shown in communication with a cellular base station 28 for transmission of the performance data. The cellular base station 28 is coupled to the Internet 32 via a number of intermediate proxies and servers that form part of the infrastructure of a cellular communications carrier (not shown).

A gateway 36 is also coupled to the Internet for receiving performance data from the OBU 20. The functionality of the gateway 36 is provided by an application service, for example operating on a server of the transit organization. Upon receiving the performance data, the gateway 36 transfers the performance data to a database server 40 coupled to the gateway 36 over a local area network 44. The database server 40 stores the performance data in a performance data database 48 which may be specially designed for the particular application. In addition, the database server 40 may manage a scheduling database 52 that may store scheduling information for vehicles and drivers in the transit organization. Some of the scheduling data is merged by the database server 40 with the performance data stored in the performance data database 48. Namely, driver-vehicle associations specifying which driver was operating which vehicle are transferred to the performance data database 48 for merging with the other performance data. Of course it is to be understood that driver-vehicle associations may accomplished in many ways, such as when a driver logs into the OBU or a ticket machine (not shown); associations from the OBU or ticket machine may be made by the OBU prior to transmitting data to gateway 36, or may be made by database server 40 after all the data is collected from the vehicle.

A mobile device 56 is also in communication with a cellular base station 28a that is similar to cellular base station 28 in many respects except that it may form part of the infrastructure of a separate cellular communications carrier. The cellular base station 28a is also in communication with the Internet 32 via a number of intermediate proxies and servers that form part of the infrastructure of the cellular communications carrier (not shown). The mobile device 56 permits a schedule manager to input and modify schedule changes, including driver changes, vehicle changes, and changes to runs along routes (such as "short-turning" a vehicle), which may in real-time as they are operating.

An analysis computer 60 is coupled to the database server 40 over the local area network 44 for analyzing the performance data stored in the performance data database 40. The analysis computer 60 executes a monitoring application that has an "adapter" that receives data from the gateway 36. The "adapter" is a communication service that connects a browser-based monitoring tool to the gateway 36 and refreshes the latest performance data as the gateway 36 receives updates from the OBUs 20.

The monitoring application also has analysis tools that support generic reports and dashboards. For example, fuel monitoring tools include fuel consumption, fuel efficiency and idle time reports with drill-downs by date, vehicle, driver and pattern. In situations where a vehicle does not have accurate, or any, fuel consumption monitoring (or simply desires to use such an approach), driver/vehicle scores can be associated to fuel consumption (such as via a mathematical approach which may be as simple as applying a factor value). This may allow fuel consumption to be determined and tracked as driver performance is tracked. The scores herein have been shown to accurately perform such task with the right factor value (which can be achieved via base line testing of vehicles and drivers over certain numbers of samples).

Real-time and historical dashboards with a variety of visualizations (graphs, pie charts and gauges) are available to give managers a summary of the vehicle fleet's performance at a glance. Managers will also be able to set thresholds on specific performance metrics so that they may identify areas for potential improvement. Managers may further be able to, via monitoring application, communicate with OBU 20 to determine or create the scoring system (such as penalty values, comparison to past performances, how to determine what is "above average", and the like) to be employed in using feedback providers for driver performance.

Additionally, the monitoring application has a component that can be used to determine driver and vehicle trends over time via analysis of the performance data in the performance data database 48. Using this information, the monitoring application can directly alert the fleet maintenance department that a particular vehicle is underperforming. Similarly, the monitoring application can directly alert human resources that a driver is exceeding performance expectations or underperforming.

Figure 2:
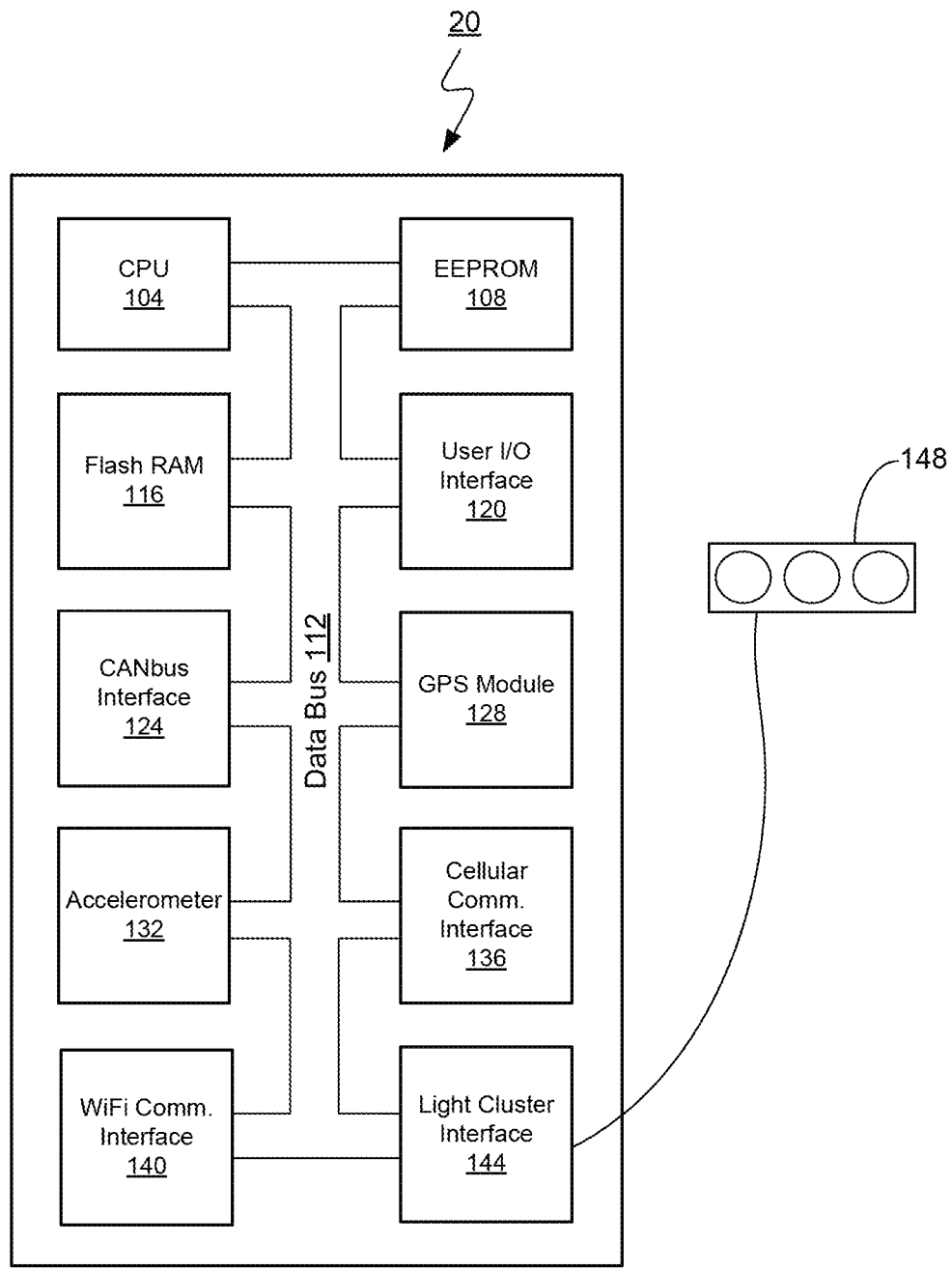
FIG. 2 is a block diagram of an on board unit installed in the vehicle shown in FIG. 1.

FIG. 2 is a schematic diagram showing a number of components of the OBU 20, as well as a connected peripheral component. The OBU 20 includes a central processing unit 104 that manages the operation the OBU 20 via an operating system stored in an EEPROM 108 and accessed over a local data bus 112. A bank of flash RAM 116 provides storage for settings and data collected during operation of the vehicle 20. A user input/output interface 120, that may provide one or more inputs and/or outputs for OBU, permits configuration of the OBU 20, optional via a connected or integrated screen (not shown). The user input/output interface 120 includes a USB port to enable the OBU 20 to be reprogrammed or reconfigured, and a reset button to reboot the OBU 20 when it is found to be functioning erratically.

A controller area network bus ("CANbus") interface 124 receives metrics from the engine and, similarly to a standard serial interface, uses a nine-pin connector. The CANbus interface reports 124 separate vehicle metrics, including, but not limited to, the engine temperature, the oil pressure, distance travelled (odometer deltas), speed, fuel usage, brake pedal position, throttle pedal position, and idle time. The particular metrics that are recorded by the OBU 20 are vehicle speed, fuel usage, breaking, throttle and idling.

While the CANbus interface 124 reports these metrics each second, it may not be desirable to report all these metrics to the gateway 36 or to store all of these metrics in the flash RAM 116. Accordingly, the OBU 20 processes and aggregates some of these metrics for user-defined n-second time intervals. For example, the distance travelled, fuel usage and idling time can be aggregated over ten-second time intervals, whereas speed, throttle pedal position and brake pedal position are averaged over the same intervals. The OBU 20 then records the performance data for this time interval in the flash RAM 116.

A global positioning system ("GPS") module 128 registers the position of the OBU 20 and, hence, the vehicle 24 in which the OBU 20 is installed. The OBU 20 can then append location information onto data collected to register its context. Additionally, the OBU 20 can transmit the location information to the gateway 36 to enable live tracking of the vehicle 24 and various other location-related functionality, as described herein.

An accelerometer 132 registers accelerometer metrics, which are measured along two axes, a longitudinal axis for measuring forward and backward acceleration, and a lateral axis for measuring lateral or side-to-side acceleration. The accelerometer 132 has a frequency of 20 Hz; that is, 20 readings per second are registered by the accelerometer for each of the two axes and reported to the OBU 20.

A cellular interface 136 communicates data collected by the OBU 20 to the gateway 36 via the cellular base station 28. The cellular communications interface 136 uses any one of GPRS, 1×RTT, EDGE, HSDPA, Mobitex, or another Internet Protocol-based data radio standard, to communicate with the cellular base station 28.

A WiFi communications interface 140 is also present in the OBU 20 for situations where less-frequent WiFi data uploads via short-ranged wireless communications are opted for in place of more frequent cellular communications.

A light cluster interface 144 (which may more generally be referred to herein as feedback interface 144) may be controlled by the central processing unit 104 and controls power to one or more feedback providers 148, such as an externally coupled light cluster 148. The light cluster 148 may be a set of three lights of different colors; i.e., green, amber and red or may be check marks that can light up, and the like—essentially any type of visual feedback. The light cluster 148 is installed adjacent the dashboard/dial cluster so that it is visible to the driver.

Other approaches to providing real-time sensory feedback or indications of performance are also considered to be within the scope of the present invention. For example, such feedback provider may be visual (lights, color displays, changing features of OBU 20 screens, and the like), tactile (vibrations of pedals of the vehicle, steering wheel, driver's seat, and the like), auditory (such as audio warnings or messages delivered via one or more speakers (not shown) or headphones (not shown) that may be connected to OBU 20). All of such approaches may be accomplished via feedback interface 144, user I/O interface 120, or other parts of OBU 20. Although feedback provider could be integral to OBU 20 (such as an attached screen or light(s), it may be preferable for it to be removably attached, allowing different feedback providers to be attached and used—all of which may be controlled by CPU 104 via feedback interface 144.

Each OBU 20 has a unique identifier that is transmitted during communications either via the cellular communications interface 136 or via the WiFi communications interface 140. The unique identifier of the OBU 20 is associated with a vehicle 24 into which the OBU 20 has been installed, and this association is registered in a performance data database 48.

Data Collection and Analysis

Figure 3:
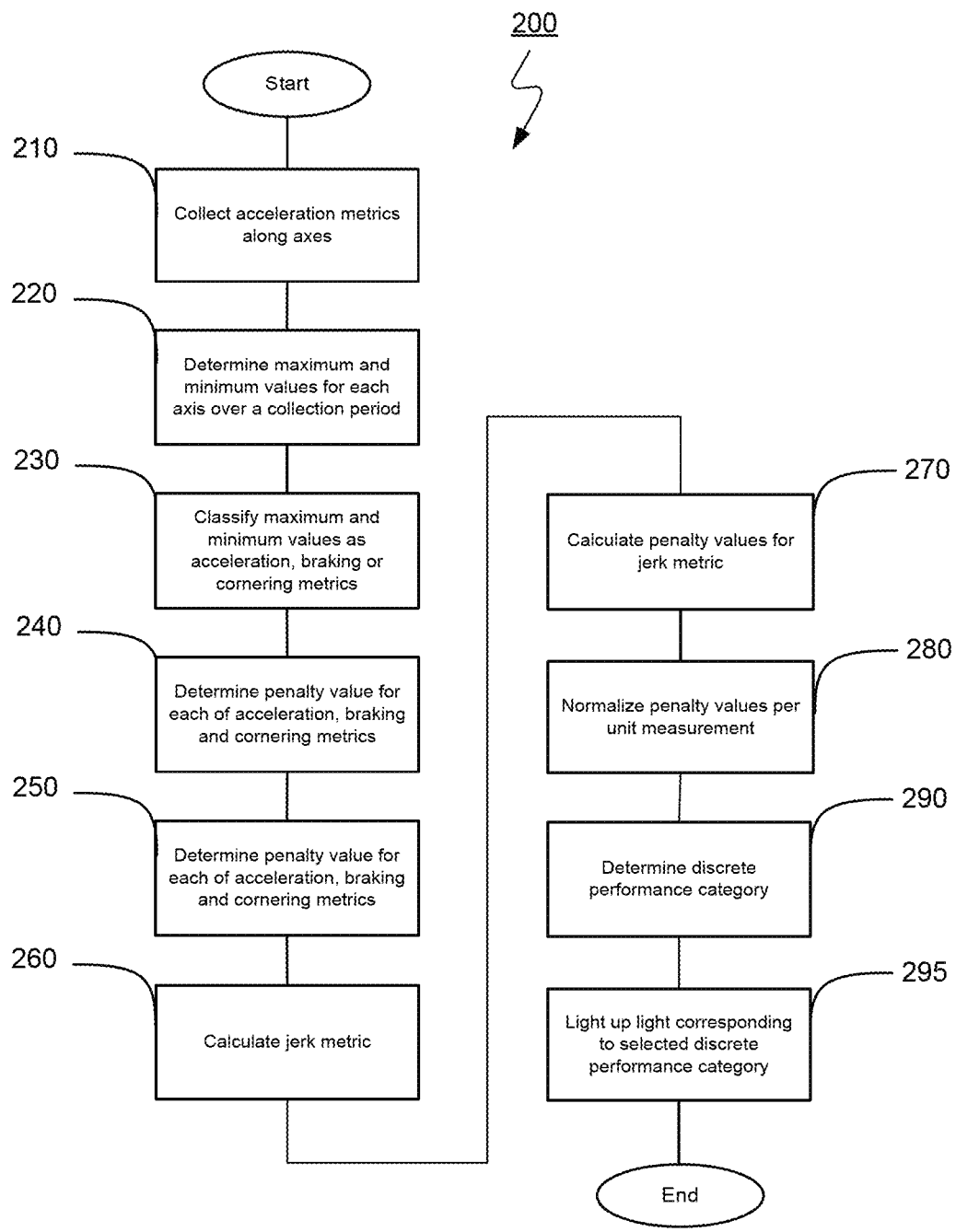
FIG. 3 is a flowchart of the general method of analyzing performance data carried out by the system of FIG. 1.

FIG. 3 shows the general method of analyzing performance data using the system of FIG. 1 generally at 200. As noted above, the accelerometer 132 reports 20 accelerometer metrics per second for each of the longitudinal and lateral axes. The OBU 20 receives these longitudinal and lateral accelerometer metrics and summarizes them over collection periods of a user-defined length, two seconds presently.

The method commences with the collection of accelerometer metrics along the longitudinal and lateral axes (210). During each two-second collection period, 40 data points are collected for each of the longitudinal and lateral axes. G-forces relate directly to the accelerometer metrics measured across the longitudinal and lateral axes. As will be understood, acceleration, as used herein, shall refer to the rate of increase in forward velocity of a vehicle. Similarly, deceleration, as used herein, shall refer to the rate of decrease in forward velocity of a vehicle. Backward movement of the vehicle is very rare and is generally low magnitude and short periods of time (ie a vehicle reverses infrequently, for short duration, and at slower speed and smaller acceleration—additionally many vehicles either do not back up on routes or driver performance is only measured while on a known route and not at a bay where reversing may occur). Positive accelerometer metrics along the longitudinal axis are associated with forward acceleration of the vehicle, and negative accelerometer metrics along the longitudinal axis are associated with slowing down or braking of the vehicle. Positive and negative accelerometer metrics along the lateral axis are associated with turning right and left respectively. This is referred to as cornering. A vehicle (and its passengers) experience g-forces laterally when the vehicle is cornering. The amount of g-forces experienced depends upon the linear speed that the vehicle is traveling at and the "sharpness" of the turn. G-forces experienced while the vehicle is turning either right or left are treated equally and interchangeably by the OBU 20.

After collecting accelerometer metrics over a collection period, the OBU 20 determines the maximum and minimum values of the accelerometer metrics for each of the longitudinal and lateral axes over the collection period (220). These maximum and minimum values define the range of metrics collected by the accelerometer 132 over the collection period for each axis. For either axis, the values may be a combination of positive, negative and zero (generally associated with stops or constant speed travel for the longitudinal axis). For example, in one collection period, the vehicle may be accelerating at the start, then braking towards the end, and the longitudinal accelerometer values will range from positive at the start of the collection period to negative at the end. Similarly, the vehicle may be cornering left at the start of a collection period, then travelling generally straight towards the end, and the lateral accelerometer metrics will range from negative at the start to zero at the end.

The OBU 20 then classifies the maximum and minimum values for the accelerometer metrics for each axis as acceleration, braking or cornering metrics (230). If the maximum accelerometer metric along the longitudinal axis is positive during a collection period, then that maximum relates to acceleration of the vehicle, and the OBU 20 sets it as the maximum acceleration metric for the collection period. If, instead, the maximum accelerometer metric along the longitudinal axis is negative or zero during a collection period, then no forward acceleration has occurred, and the OBU 20 sets the maximum acceleration metric to zero for the collection period. If the minimum accelerometer metric along the longitudinal axis is negative during a collection period, then that minimum relates to slowing down or braking of the vehicle. Here, the OBU 20 takes the absolute value of the minimum accelerometer metric to filter out the directional component and obtain its magnitude, and sets it as the maximum braking metric for the collection period. If, instead, the minimum accelerometer metric along the longitudinal axis is positive or zero during a collection period, then no slowing down or braking has occurred, and the OBU 20 sets the maximum braking metric for the collection period to zero. These metrics are thus selected as representative of the collection period for each driving scenario, or another approach, as described herein, may be used for the collection period.

The OBU 20 sets the maximum cornering metric as the maximum value of the absolute values of the lateral accelerometer metrics collected during the collection period. Cornering left and right may be treated equally, with the OBU simply looking at the magnitudes of the lateral accelerometer metrics to determine the largest value to use as the maximum cornering metric. However, left and right may be treated separately, with a maximum (and averages, as described herein) being stored separately—for example as vehicles and drivers may handle left and right turns differently (for example where a steering wheel is on one side or the other, or cars drive on one side of the road or the other).

Next, the OBU 20 determines a penalty value for each of the maximum acceleration, braking and cornering metrics determined at 230 for the collection period (240).

Figure 4:
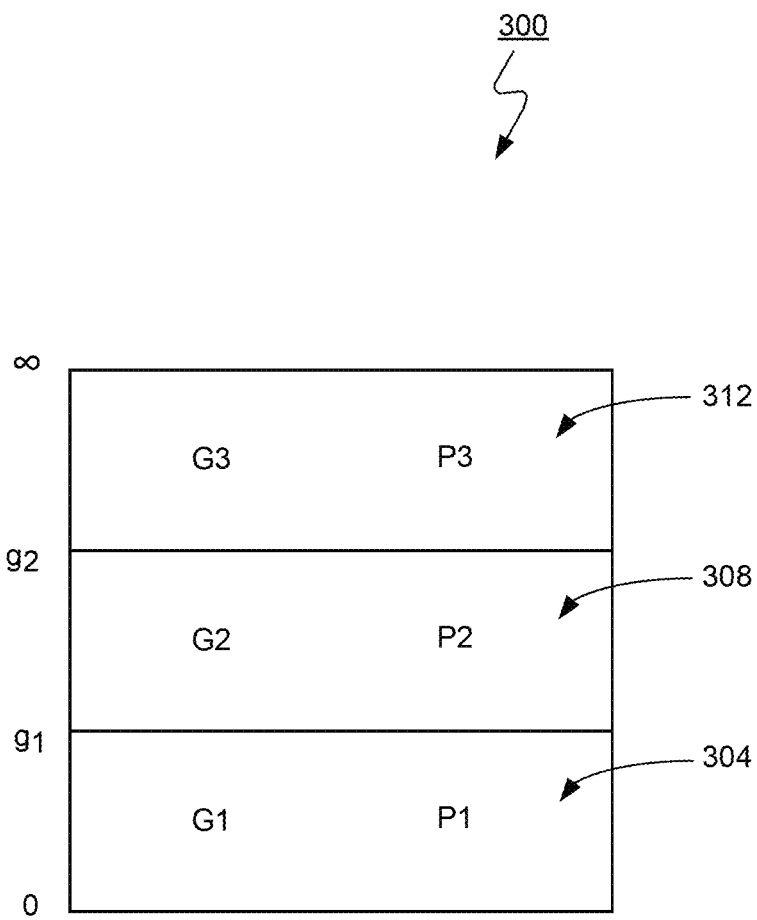
FIG. 4 is a schematic diagram of a template for scoring accelerometer metrics.

FIG. 4 shows a template 300 for determining penalty values for the maximum acceleration, braking and cornering metrics. The template consists of three ranges of values and three corresponding penalty values (note the user can have more than three ranges but for the purpose of explanation three will be assumed). A first range 304, labeled "G1", extends from zero to $g_1$ and has a corresponding penalty value of P1. A second range 308, labeled "G2", extends from $g_1$ to $g_2$ and has a corresponding penalty value of P2. A third range 312, labeled "G3", extends from $g_2$ and higher and has a corresponding penalty value of P3. Thus, if a maximum accelerometer metric is greater than or equal to $g_1$ and is less than $g_2$, a penalty value of P2 is assigned. The user can define separate templates to score each of the acceleration, braking and cornering metrics. While the range-defining points, $g_1$, $g_2$ and $g_3$, are the same for the templates used to score acceleration, braking and cornering metrics, the corresponding penalty values vary between the three.

The following table is used to determine a penalty value for the various metrics collected during a defined period. Note that the Jerk penalty may be assigned based upon the change in the acceleration for two consecutive collection periods being greater than a user defined value—in our example above we have a 3.0 penalty point assigned to the penalty score if the rate of increase in the acceleration exceeds 60% between successive OBU readings:

| Situation | G1 | G2 | G3 |
|---|---|---|---|
| Cornering | 0.0 | 3.0 | 20.0 |
| Braking | 0.0 | 5.0 | 10.0 |
| Acceleration | 0.0 | 7.0 | 30.0 |

As will be noted above, the penalty values are set to give higher scores for g-forces experienced while accelerating versus the same level of g-forces experienced while braking. These penalty values have been set appreciating the fact that vehicles will need to break quickly from time to time to avoid contact with other vehicles, pedestrians or other obstructions—in other words situations that go beyond the control of the driver. Further, it is noted that hard acceleration is generally avoidable and detriments fuel economy significantly.

As the data is downloaded from the OBU 20, the system determines a penalty value for each of the maximum acceleration, braking and cornering metrics using the above tables for each collection period.

Once the penalty values have been determined for the maximum acceleration, braking and cornering metrics and the jerk metric, the OBU 20 normalizes the penalty values per Unit Distance (280). The normalization process takes into account the distance used to determine the penalty value and it reduces the significance of outliers and better represents a driver's (and vehicle's) behavior over time. One-off anomalies can be captured via an incidence analysis process that is described below.

For purposes of the normalization process, a Unit Distance, such as 500 meters, over which the performance data (i.e., the penalty scores) are normalized is selected. This Unit Distance is user-defined at the set-up of the system and can be modified as desired later.

Figure 5:
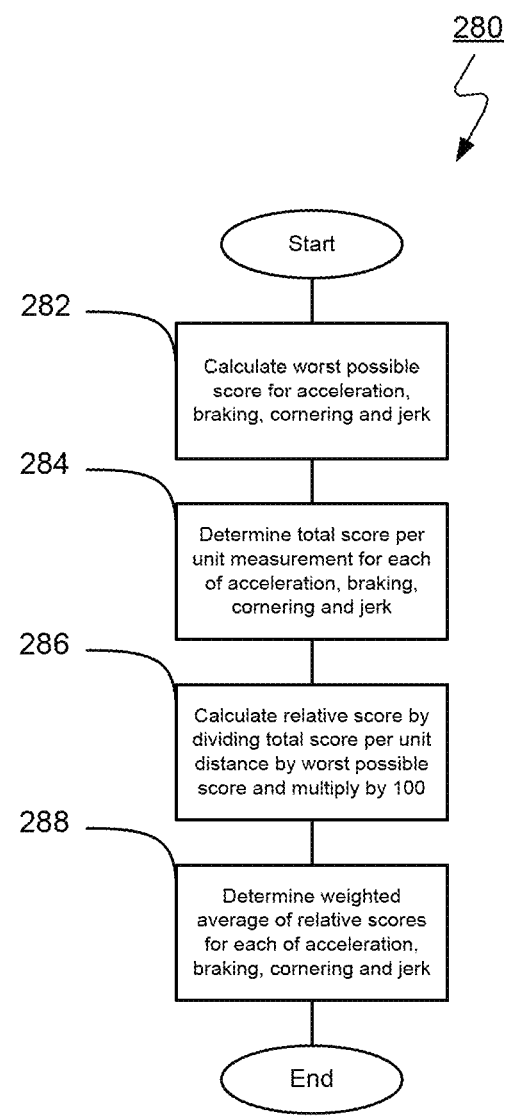
FIG. 5 is a flowchart of the method of normalizing the penalty values per unit measurement.

FIG. 5 shows the general method of normalizing the penalty values per Unit Distance 280. First, the worst possible scores that can be obtained over all the selected Unit Distance for each of acceleration, braking, cornering and jerk are calculated (282). These worst possible scores are universal constant numbers that are pre-generated to enable universal comparison. Next, the total score per Unit Distance for each of acceleration, braking, cornering and jerk are determined (284), in at least one of the many ways described herein. Using the worst possible score for each of acceleration, braking, cornering and jerk determined at 282, relative scores for the Unit Distance for each of acceleration, braking, cornering and jerk are calculated as follows:

$$RSUM(A) = \frac{SUM(A)}{WPS(A)} \times 100,$$

where SUM(A) is the sum per Unit Distance for acceleration determined at 284, WPS(A) is the worst possible score for acceleration for the Unit Distance, and RSUM(A) is the relative Score per Unit Distance (SUD) for acceleration;

$$RSUM(B) = \frac{SUM(B)}{WPS(B)} \times 100,$$

where SUM(B) is the sum per Unit Distance for braking determined at 284, WPS(B) is the worst possible score for braking for the Unit Distance, and RSUM(B) is the relative Score per Unit Distance for braking;

$$RSUM(C) = \frac{SUM(C)}{WPS(C)} \times 100,$$

where SUM(C) is the sum per Unit Distance for cornering determined at 284, WPS(C) is the worst possible score for cornering for the Unit Distance, and RSUM(C) is the relative Score per Unit Distance for cornering; and $$RSUM(J) = \frac{SUM(J)}{WPS(J)} \times 100,$$

where SUM(J) is the sum per Unit Distance for jerk determined at 284, WPS(J) is the worst possible score for jerk for the Unit Distance, and RSUM(J) is the relative Score per Unit Distance for jerk.

Once the relative scores per Unit Distance have been calculated, a weighted average of the relative scores per Unit Distance for each of acceleration, braking, cornering and jerk is determined (288). The weighted average is calculated as follows:

$$WSUM = \frac{W1 \times RSUM(A) + W2 \times RSUM(B) + W3 \times RSUM(C) + W4 \times RSUM(J)}{W1 + W2 + W3 + W4},$$

where W1, W2, W3 and W4 are weightings that are provided to each of the relative scores In order to maintain the normalization the sum of the weightings W1+W2+W3+W4=should equal 100. The weighted score per Unit Distance can then be used to assess the performance of the driver and/or vehicle.

Once the weighted average score per unit measurement has been determined, it is categorized into one of a set of discrete performance categories (290). Remembering that the RSUMs are scores between 0 and 100 and that WSUM is a weighted average of the RSUMs, the weighted score per unit measurement is therefore a value between 0 and 100.

Three discrete performance categories are defined for the WSUM. A first discrete performance category generally corresponds to above-average performance and covers the range [0,30]. A second discrete performance category generally corresponds to average performance and covers the range [30,50]. A third discrete performance category generally corresponds to below-average performance and covers the range [50,100].

After determining the discrete performance category into which the weighted score per unit measurement fits, the light corresponding to the discrete performance category is lit up (295). If the calculated WSUM is in the first discrete performance category, a green light is lit up. If the calculated WSUM is in the second discrete performance category, an amber light is lit up. If the calculated WSUM is in the first discrete performance category, a red light is lit up. The light is kept lit until the next weighted score per unit measurement is determined, after which the appropriate light is lit up.

Presently, the OBU 20 sends the performance data to the gateway 36 every 30 seconds, although other frequencies can be used. The frequency can be adjusted to accommodate for, amongst other factors, the cost of data communications over the cellular communications network. In addition, the OBU 20 stores these weighted averages in storage.

Optionally, method 200 may include downloading to OBU 20 performance data for the one or more occurrences of a run/known route/driver/vehicle/etc that most closely matches that which is currently being evaluated, such being referred to herein as historical metrics, which may include one or more of historical driver metrics and historical vehicle metrics, and historical route metrics. Then, at 290, the current values may be compared against historical metrics/values (from the last time such combination was run, from the driver's average performance in the same circumstance, an average across all driver's in the same circumstance, or a best performance in the same circumstance, by way of example) and categorized. In such a scenario the discrete performance indicators may simply be a positive or negative (performing well or not, such as by lighting a green or red light) or may involve multiple performance indicators at the same time (comparison of real-time values to more than one stored past performance data) driver may simply be presented whether they are doing okay (green light for example) or not (red light for example)—though of course any type of feedback provider may be used. Of course GPS data may be used (in both the real-time collection of data, and used from the stored and downloaded data) to ensure that the same portions of the route/run are being compared and so that advanced warning of incident locations, or possible incident locations, may be provided. Of course this may be done while not on a known route providing it is possible to predict that the vehicle may be confronted with a particular incident (perhaps as simply as determining that the vehicle is geographically somewhat close to the incident location).

In one or more embodiments, the following driver feedback techniques may be employed, using one or more discrete performance categories:

i. Immediate feedback if a measurement is above a threshold (an axis reading above a proscribed limit, a sum for a collection period being above a proscribed limit, etc—where such occurences may be classified as incidents and tracked as described herein). The tri-light could flash red for a few seconds, for example, to indicate this.

ii. Continuous feedback over a unit of distance where OBU 20 monitors the score over a unit of distance (or multiple units of distance) and compares this to the vehicle's or driver's average score (using historical metrics). The tri-light would show green> Better than some average, Yellow> Slightly worse or close to some average, Red> worse than some average.

iii. Cluster warning, the unit is uploaded with details (locations, speeds, type of incident, and the like) of where we have clusters of unacceptable behavior (such as incidents)—i.e. where, historically, the tri-light has flashed red (in "i" above) across the entire population of drivers and vehicles (or some combination of drivers and vehicles). When the vehicle approaches such a cluster all three lights (Green, yellow and red) may light up, for example. This may assist the driver in increasing their attention. Optionally these clusters or incidents may be tuned for the driver (ie if the driver is jerky in right turns, then right turns may be incidents that result in a pre-warning). In this way monitoring of performance data occurs simultaneously with training Knowledge of upcoming right turns may be from OBU 20, which may come from route information accessible by OBU 20, from GPS data, database server 40, and the like (historical route metrics).

Driver-Vehicle Association

The performance data collected via the OBU 20 and stored in the performance data database 48 is combined with scheduling data from the scheduling database 52 (or other data sources for driver-vehicle associations, as described herein) that contains the planned schedule—which driver should be driving which vehicle at what day and time. When merged, this scheduling data becomes part of the performance data. In the absence of an existing driver identification system in vehicles, the system relies on driver-vehicle pairings from the scheduling database 52 from 'pull out' to 'pull in' of a driver with a vehicle 24 or other sources, as described herein.

The association of a driver with a vehicle stored in the scheduling database 52 comes from two sources of information—the planned service and the actual service. The planned service is the result of a formal scheduling process that considers the following when assigning drivers to vehicles:

the trips that need to be performed the way these trips are linked together into vehicle assignments called blocks and defined by a pull-out time/location to a pull-in time/location the division of the vehicle assignments into pieces of work assignments for drivers called "runs" and defined by an 'on bus' time/location to an 'off bus' time/location the allocation of the work assignments to drivers, taking into account any planned absences, such as vacations The planned service is planned using a bidding process that is a commonplace approach for problems where demand and supply are to be matched.

When a driver starts his work assignment, he is allocated a vehicle. The driver will stay with that vehicle until he is either relieved by another driver or the vehicle is returned back to the depot at the end of the block. This means that, based upon the work assignments, the driver can operate more than one vehicle and a vehicle can be operated by more than one driver over a block.

What actually happens on the day of service, however, may be very different from the planned service. Drivers may call in sick or not turn up and will need to be substituted, vehicles may break down and need to be replaced, and so on. In order to ensure that an accurate picture of the day is recorded, all the exceptions to the planned service must be noted. It is therefore a combination of the planned service and the recorded exceptions to that planned service that defines the true daily events for the drivers and the vehicles. Recording driver-vehicle assignments accurately is important if an accurate driver or vehicle performance analysis is to be performed.

Merging and Analysis of the Performance Data

During regular operation, the database server 40 merges the performance data from the performance data database 48 with the adjusted planned service data from the scheduling database 52 for the runs along the plurality of routes. In particular, during the merging, records for runs in the performance data are matched up with the adjusted planned service by determining when a vehicle was being operated by a particular driver, based on the pull-out and pull-in data, and associating runs for that vehicle over that period of time with that driver. Some checks are subsequently performed to evaluate the integrity of the data to ensure that the merged data is valid (e.g., that a driver was not registered as driving two vehicles simultaneously or that a vehicle was not performing two runs simultaneously).

The system handles driver and vehicle changes easily, as the unit measurement can be selected so that a driver/vehicle combination complete a number of unit measurements per pair-up.

The worst possible score can be varied in some scenarios, such as to take into consideration factors such as vehicle type (as different vehicle types have different operating characteristics), day-time period (as rush hour can have more start-stop traffic), etc. Generally, however, the worst possible score will be kept constant (even between unrelated transit agencies possibly in different countries, cities, climates, and the like—enabling comparison between drivers across the world).

While the unit measurement has been described as a distance, the unit measurement can also be a measurement of time.

Various methods of summarizing the metrics will occur to those skilled in the art. For example, each incident of exceeding a threshold value can be scored, tallied or otherwise registered. The data associated with that incident (GPS location, acceleration data and other data relative to the driver/vehicle/environment) may be collected by OBU 20 and communicated along with other data from OBU 20. This may allow both scores and incidents to be used and monitored with monitoring application 60, and OBU 20 (such as for other routes, drivers, conditions).

Various scoring schemes can be employed. The score for a collection period can be, for example, determined in accordance with a function of the accelerometer metric of the largest magnitude for an accelerometer metric for the collection period, or via various summing methods.

While the invention has been described with reference to road vehicles, those skilled in the art will appreciate that it can also be applied to vehicles for transporting across other types of routes, such as rail, for example.

Calculations of the various scores, and aspects thereof, may be done, in whole or in part, on the OBU or any part of gateway 36, database server 40 or analysis computer 60. Factors influencing such selection may include bandwidth, use of the scores (how quickly they are needed, for example), processing power, and cost of communications.

Although acceleration metrics/data are largely described herein as originating from one or more accelerometers, other sources are also contemplated to be able to provide the required or useful data. Exemplary sources may include: GPS, wheel speed, turn sensors, gyroscopes, and the like.

This concludes the description of the presently preferred embodiments of the invention. The foregoing description has been presented for the purpose of illustration and is not intended to be exhaustive or to limit the invention to the precise form disclosed. It is intended the scope of the invention be limited not by this description but by the claims that follow.

What is claimed is:

1. A method for providing real-time feedback to a vehicle driver, comprising:
   collecting a set of metrics for a vehicle from an on-board unit installed on the vehicle, the collecting further comprising downloading to the on-board unit a set of historical metrics comprising historical vehicle metrics from the vehicle and historical driver metrics for the vehicle driver wherein the collecting occurs as the vehicle is being operated on a known route and the historical metrics were obtained on the known route;
   categorizing each metric of the set of metrics into one of a set of discrete performance categories, using the set of historical metrics; and
   presenting sensory feedback to a vehicle driver corresponding to said one of a set of discrete performance category, as the vehicle is being operated by the vehicle driver, wherein the presenting occurs as the vehicle is being operated on a known route and the historical metrics were obtained on the known route;
   wherein the sensory feedback is provided by a feedback interface including a light cluster providing visual feedback and a tactile feedback provider providing vibrations on a pedal and a steering wheel of the vehicle.

2. The method of claim 1, wherein the collecting further comprises: obtaining a set of historical incidents for a route the driver is driving and a set of historical incidents for the driver where each incident comprises an incident location where the incident occurred.

3. The method of claim 2, wherein the presenting sensory feedback comprises: determining if an incident occurred at a location on the route the driver is driving, before the driver has arrived at the location; and
   presenting sensory feedback to a vehicle driver corresponding to said one discrete performance category, as the vehicle is approaching the location.

4. The method of claim 2, wherein the presenting sensory feedback comprises: determining if any incident in the set of historical incidents for the driver may occur at a future location on the route; and presenting sensory feedback to a vehicle driver corresponding to said one discrete performance category, as the vehicle is approaching the future location.

5. The method of claim 1 wherein the historical metrics further comprise average metrics for all drivers of the vehicle and the categorizing further comprises comparing the set of metrics with the average metrics for all drivers of the vehicle.

6. The method of claim 1, wherein the collecting further comprises:
   uploading a set of clusters of unacceptable behaviors across the entire population of drivers and vehicles and a second set of cluster of unacceptable behavior tuned for the driver.

7. The method of claim 6, wherein the presenting sensory feedback comprises: determining if a cluster of unacceptable behavior across the entire population of drivers and vehicles occurred at a location on the known route the driver is driving, before the driver has arrived at the location; and
   presenting sensory feedback to a vehicle driver corresponding to said one discrete performance category, as the vehicle is approaching the location.

8. The method of claim 6, wherein the presenting sensory feedback comprises: determining if a cluster of unacceptable behavior tuned for the driver may occur at a future location on the known route; and presenting sensory feedback to a vehicle driver corresponding to said one discrete performance category, as the vehicle is approaching the future location.

9. The method of claim 8, wherein a second set of cluster of unacceptable behavior tuned for the driver comprises jerkiness in right turns and wherein a future location on the known route comprises a right turn.

\* \* \* \* \*